Inventors
George Bell
Robert L. Clark

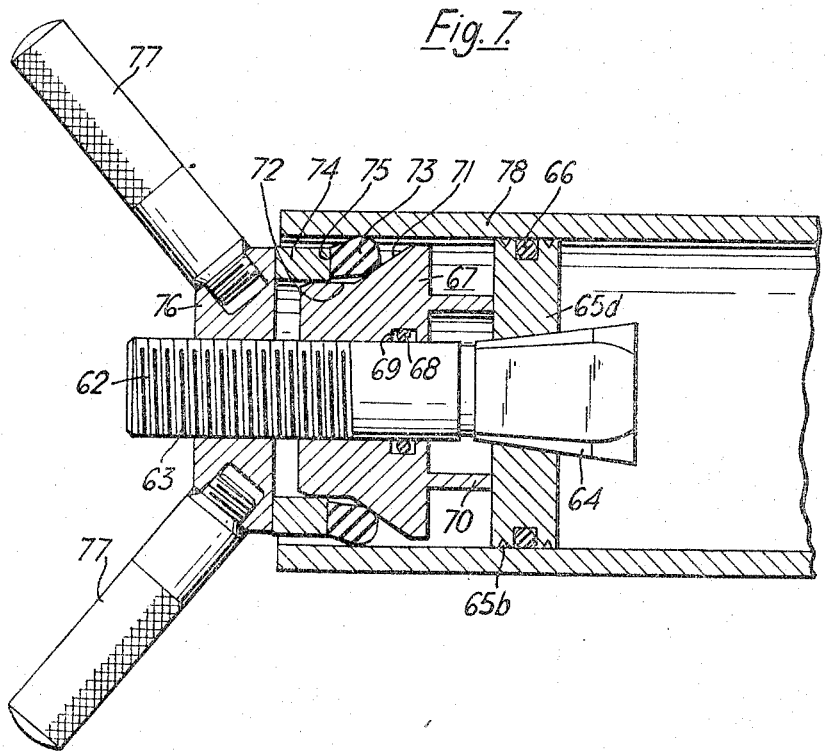

United States Patent Office 3,323,551
Patented June 6, 1967

3,323,551
HYDROSTATIC TUBE TESTING EQUIPMENT
George Bell, Swindon, and Robert Lionel Clarke, West Drayton, Middlesex, England, assignors to High Pressure Components Limited, West Drayton, England, a British company
Filed Mar. 13, 1964, Ser. No. 351,620
7 Claims. (Cl. 138—90)

The tubes of high-pressure water tube boilers are submitted to water test pressures of up to 10,000 lbs. per square inch and sometimes even more before they are assembled. When this test pressure is applied, the ends of the tubes must be sealed temporarily sufficiently strongly to withstand this pressure. The usual way of doing this has been to face and weld a plug into each end of the tube and to tap a hole in one plug for the connection of a pipe through which the water under pressure is supplied and the displaced air is expelled. When the test is complete the plugs in the ends of the tube are machined away. The expense involved in machining and welding the plugs and then cutting them away again is very considerable. Similar considerations apply in the testing of manifolds for use with boilers and other plant which has to withstand a high internal pressure and in both cases, there may be a number of circular openings or branches which must be closed.

According to this invention, we provide a stopper for insertion in the bore of a tube or like circular opening during pressure testing, the stopper comprising a tapering core having at one end a closure plug with a sealing ring around its periphery and, slidably mounted on its tapering surface, a divided gripping ring which is expanded by the wedge action of the core upon outward movement of the core relative to the ring within the tube or like opening under the thrust exerted on the plug by the test pressure to hold the stopper in position.

To close the end of the tube, or other circular opening, for pressure test purposes, the stopper is inserted into the opening and the closure plug together with the tapered core attached to it is drawn outwards in relation to the gripping ring so that the ring is expanded into contact with the bore of the tube or the inside surface of the opening. This holds the stopper in position but only provides a limited resistance to the pushing of the plug outwards again. However, upon application of the water test pressure to the inside of the tube in a gradual manner, this pressure acts on the closure plug and forces it and the core outwards. The gripping ring is held in position by its contact with the bore of the tube and therefore the core moves within the gripping ring and expands it still further. The actual water seal is provided by the sealing ring around the periphery of the closure plug and the force to hold the plug in position against the pressure is provided by the gripping ring. It has not previously been thought possible to withstand pressures of the order of 10,000 lbs. per square inch by any form of closure plug, but this device has been found, very surprisingly, to withstand pressures of this order without difficulty.

Preferably, the closure plug is at the wider end of the tapering core and the stopper is inserted in such a manner that the plug is innermost. The pressure on the plug then pushes the core into the divided gripping ring to hold the ring in position. Alternatively however, the plug may be at the narrower end of the core and then the stopper is inserted with the plug outermost and the pressure on the plug then pulls the core into the ring.

To force the core further into the divided gripping ring, in the case where the plug is at the wider end of the core, and at the same time to hold the ring in position so that the gripping ring is expanded, a part of the core which, in use, projects from the tube or other opening is preferably screw threaded and is provided with a nut and a spacer piece between the nut and the gripping ring. Tightening of the nut presses the spacer against the gripping ring and moves the gripping ring relatively to the tapering surface towards its wider end. It has been found that with tubes up to 2 or 3 inches in diameter, it is only necessary to tighten this nut finger tight to obtain the necessary initial jamming effect with the gripping ring. The further force to withstand the high test pressure is then provided by this pressure acting upon the plug and forcing the tapered core slightly outwards.

The tapering portion of the core may be conical and in this case the divided gripping ring has a corresponding conical bore and is preferably divided into three similar segments so that a substantially uniform pressure is developed between the bore of the tube and the periphery of the gripping ring. However, with a conical taper on the core and a corresponding conical bore in the gripping ring, the gripping ring will only fit accurately on the core in one position along the length of the taper. As the core is forced outwards by the internal pressure, and the gripping ring moves along the taper towards its wider end, the segments of the gripping ring will only seat on the taper at their ends. It has been found that this is not particularly deleterious and very adequate fixing of the plug within the tube is still obtained, but some damage to the tapering surface of the core does result where the gripping ring segments bite into it. To overcome this difficulty, however, the tapered core can be in the form of a pyramid.

The sealing ring which surrounds the periphery of the plug may be a simple O-sealing ring which fits in a groove in the periphery of the plug. This has been found to provide an adequate seal for pressures up to 10,000 lbs. per square inch, but a more elaborate form of sealing ring is very desirable for higher pressures than these. To enable an O-ring to maintain a pressure seal, it is essential there is only a small clearance of a few thousandths of an inch between the closure plug and the bore of the tube. This clearance must be considerably less than the tolerance in the internal diameter of the tube and therefore a number of different closure plugs may be necessary for closing a number of tubes of the same nominal bore. The closure plug may be integral with the core, but in this case a number of different cores must also be provided if the tubes are of slightly different diameters as they will be due to manufacturing tolerances, at least in the larger sizes. With small tubes, for example having a bore ¼ inch in diameter, this is acceptable since discrepancies for the nominal bore sizes are slight and in general a standard plug will fit all pipes of any given nominal diameter. However for larger tubes and pipes for example above ¾ inch in diameter the expense and the storage involved for the larger number of stoppers which may be necessary for a boiler maker or other potential user, is undesirable. To overcome this in one way the plug may be detachably fitted on the end of the core. For this purpose, the core may have an annular shoulder and the plug may have a bore through which the part of the core beyond the annular shoulder fits. The plug is held against the annular shoulder by a nut screwed onto a threaded portion on the end of the core. Another sealing ring, which may be an O-ring, is provided between the core and the bore in the plug.

When the sealing ring is a simple O-ring it may not always be possible to use the stopper satisfactorily with tubes of the kind which are formed by welding together the edges of a helically wound strip. In order to provide a stopper which is able to accommodate small variations in the diameter of the tube, such as is found with this kind of tube, and also to allow for slight unevenness in the surface of the bore, the closure plug may have a truncated conical part, a cylindrical part extending outwards from the smaller end of the cone and a sealing ring which extends around the plug with a backing ring which is slidable on the cylindrical part to support the sealing ring and push it up the conical surface to expand it into contact with the bore of the tube or other opening, a mechanism being provided for pushing the backing ring and sealing ring along the cylindrical part of the plug and for pushing the divided gripping ring along the tapering surface of the core to expand it and cause it to grip the bore.

The amount by which the sealing ring is expanded is varied by the distance which it is pushed by the backing ring along the truncated conical surface and in this way tubes of slightly differing bore diameters can still be sealed effectively. Further, because the sealing ring is supported by the backing ring, a ring of greater cross section can be used and this allows more distortion of the ring to take place to allow it to accommodate unevenness in the surface of the bore.

When the closure plug is of this construction it is preferably slidably mounted on the narrower end of the core and has a spacer piece in front of it which bears against the gripping ring. With this arrangement, the same mechanism can be used for pushing the backing ring along the cylindrical part of the closure plug and for pushing the gripping ring up the tapering core to expand the ring, the thrust being transmitted from the backing ring to the sealing ring and thence through the plug and the spacer to the gripping ring. When the plug is slidably mounted on the core in this way, a seal must of course be provided between the plug and a core and this may suitably be a rubber O-ring held in an annular groove in the wall of the bore in the plug through which the core passes.

The mechanism which pushes the backing ring along the symmetrical part of the plug may most simply consist of a screw threaded ring which is screwed on to a threaded portion of the core and bears against the outer radial face of the backing ring. The screw threaded ring may lie outside the end of the tube when the gripping ring and sealing ring are inserted within the end of the tube and it may then be provided with a pair of radially extending handles to enable it to be tightened manually. With this arrangement, the backing ring may be made as an integral part of the screw threaded ring or it may be fixed to it.

As an alternative to this screw arrangement for moving the backing ring, with stoppers for closing pipes of large diameter, for example 36 in. diameter or more, where the screw threaded ring would be too large and too much effort would be necessary to tighten it, a hydraulic ram may be used instead. This ram may be supplied with water under pressure as a supply must already be available for carrying out the pressure test. When a hydraulic ram is used, its piston is annular and extends around the core within a cylinder fixed to the core and the piston acts on the backing ring and may if required be integral with it.

To facilitate the insertion of the stopper into a boiler tube, the segments of the gripping ring are preferably held in position on the core by a surrounding spring ring which fits in a peripheral groove in the segments and holds them in position, but allows them to expand as they move up the taper. This spring ring may be another rubber O-ring.

To facilitate removal of the stopper from the tube after use when the plug is at the wider end of the core, a compression spring may be placed between the plug and the split gripping ring to push the ring back towards the narrower end of the core and allow the ring to contract again when the pressure is released and the nut which acts on the spacer is loosened. This allows the stopper to be withdrawn back.

When testing a tube water is supplied at one end of the tube and air displaced during filling can be allowed to escape through the same bore. Preferably, however, the air is expelled at the other end of the tube until the tube is full of water. For the supply of water, the core of the stopper may be provided with a central bore and a union at its outer end for the connection of a water supply pipe. The air should be allowed to escape at the top of the bore of the tube to ensure that the tube is completely filled, and for this purpose the core may have a bore which extends through it from its outer end to a point within the plug. A second bore communicates with this axial bore and extends to the outer surface of the part of the core on which the plug is mounted. Here it communicates with an annular groove in the core and this annular groove in turn communicates with a radial bore in the plug. This radial bore communnicates with a notch in the periphery of the plug on the upstream side of the sealing ring. Air can thus escape through the notch, which when the plug is inserted in a bore tube is at the top dead centre of the bore of the tube, thence down through the radial bore in the plug into the peripheral groove in the core. From here the air passes round the groove down through the radial bore in the core and out to the atmosphere through the axial bore in the core. The axial bore in the core is fitted at its outer end with a screw threaded closure plug or with a valve so that it can be closed when all the air has escaped and water starts to flow out.

When testing a manifold which has a number of branches or other circular openings, water may be supplied through one opening and air may be allowed to escape from another. All the other openings are completely sealed and for this purpose stoppers may be used without any bore through the central core.

Some examples of stoppers constructed in accordance with the invention are illustrated in the accompanying drawings, in which:

FIGURE 7 is a longitudinal section, similar to FIGURE 1, but through a third example shown in position in a tube.

Figure 1:
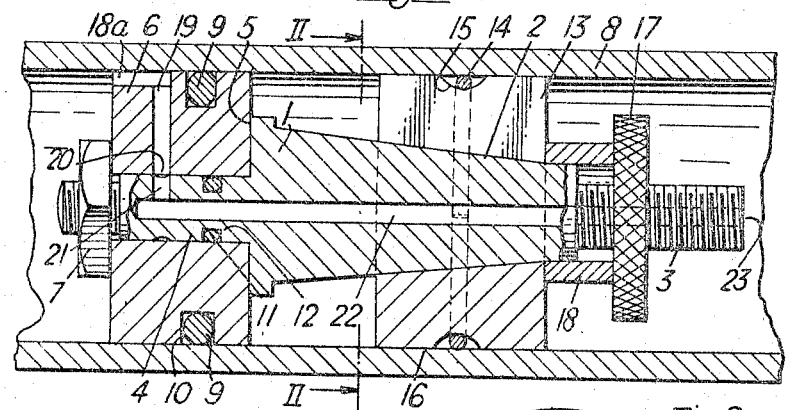
FIGURE 1 is a longitudinal section through one example, shown in position in a tube.

The stopper shown in FIGURE 1 has a stainless steel core 1 having a central section 2 which is frusto-conical in shape with an included angle of 15 degrees and end portions 3 and 4. The end portion 3 is of smaller diameter than the smaller end of the conical portion 2 and is screw threaded on the outside. The end portion 4 is cylindrical and of approximately the same diameter as the portion 3. At the junction between the portions 2 and 4 there is an annular shoulder 5.

A ring 6, which forms a closure plug, is held on the cylindrical portion 4 of the core by a nut 7 screwed onto the end of the portion 4. The ring 6 is a close fit within a boiler tube 8, the end of which is being closed by the stopper for test purposes. The clearance between the ring 6 and the bore of the tube 8 should not exceed 20 thousandths of an inch, although it will vary slightly with variations in the diameter of the bore of the tube 8. This clearance is sealed by a rubber O-ring 9 carried in an annular groove 10 in the periphery of the ring 6. The joint between the ring 6 and the cylindrical portion 4 is sealed by another O-ring 11 carried in a groove 12 in the portion 4.

A gripper ring 13 consisting of three similar segments 13a, 13b and 13c (see FIGURE 2) is carried on the conical portion 2 of the core 1. The three segments forming the ring 13 are held in position by a resilient rubber ring 14 which surrounds the segments and lies within a groove 15 in their periphery. The peripheral surface 16 of the segments 13a to 13c is roughened.

A knurled nut 17 is screwed onto the portion 3 of the core 1 and between this nut and the edge of the ring 13 is a spacer tube 18. By screwing up the nut 17, the gripping ring 13 is pushed to the left, as seen in FIGURE 1, along the conical portion 2 and the segments 13a to 13c are thus moved apart from each other so that the ring is expanded.

Figure 3:
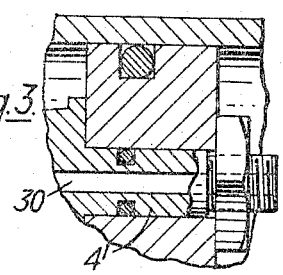
FIGURE 3 is a scrap section showing a modification of the example shown in FIGURE 1.

In use, the assembled stopper is inserted in the end of a boiler tube to be tested with the portion 3 and the nut 17 protruding from the end. The nut 17 is then tightened by hand and this expands the ring 13 sufficiently to enable it to obtain a small grip on the inside of the tube. A stopper which is similar except for the modifications shown in FIGURE 3 is inserted in the remote end of the tube. Water is supplied to the tube through the stopper at the remote end and the air displaced from the tube is forced out through a notch 18a in the periphery of the ring 6, down through a radial bore 19 in the ring 6 and into a peripheral groove 20 in the portion 4 of the core 1. From this groove, the air passes down through a further radial bore 21 in the portion 4 and thence into an axial bore 22 which extends from a point near the end of the portion 4 right the way through the core 1 to an open end 23. When all the air has been displaced from the tube and water starts to flow from the opening 23, this is closed by a stop valve or by a screw threaded cap (not shown) with a sealing washer which is screwed onto the end of the portion 3.

The water pressure then increases and this pressure acting on the left hand face of the ring 6 forces this ring and with it the core 1 towards the right. Because the ring 13 has a frictional grip on the inside of the boiler tube 8, it remains stationary in an axial direction and the conical portion 2 is forced into it so that it is expanded still further and jammed tightly within the bore of the tube 8.

The stopper shown in FIGURE 3 which closes the remote end of the tube 8 is not provided with the air outlet notch 18, bores 19 and 21 and the groove 20. Instead, an axial bore 30 extends right the way through the portion 4' of the core. A coupling is screwed onto the other end of the core and the water is supplied under pressure through the core 30.

Figure 2:
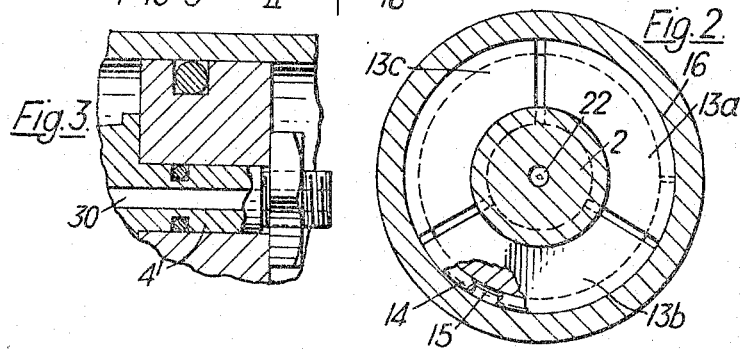
FIGURE 2 is a cross-section as seen in the direction of the arrows on the line II—II in FIGURE 1.
Figure 4:
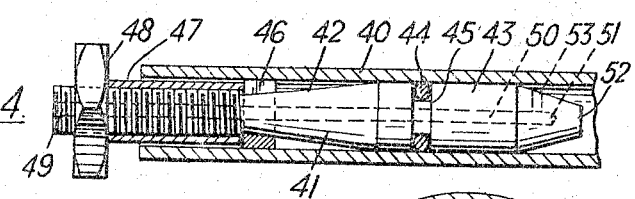
FIGURE 4 is a longitudinal section through a second example for closing a boiler tube of a smaller diameter than that shown in FIGURE 1.

The second example illustrated in FIGURE 4 of the drawings, is used in a boiler tube 40 which has an internal diameter of a ¼ inch and is very much smaller than the tube 8 shown in FIGURES 1 and 2. This example has a core 41 with a conical portion 42 and at its right hand end as seen in FIGURE 4, an integral plug portion 43. The plug portion 43 carries an O-ring 44 in a peripheral groove 45. On the conical portion 42 is a ring 46 which is formed in three segments in a manner generally similar to the ring 13 shown in FIGURE 1. The left hand end of the ring 46 is acted upon by a spacer tube 47 which in turn abuts a knurled nut 48 screwed onto a portion 49 at the left hand end of the core 41.

An axial bore 50 extends right the way through the core 41 and the plug 43 has a blind end 51 in a hose 52 on the end of the plug 43. A radial bore 53 communicates with the bore 50.

The stopper is inserted in the end of the tube in the same manner as the stopper illustrated in FIGURES 1 and 2 of the drawings and it is held in position initially by tightening the nut 48. Air escapes from the tube, as it is filled with water, through the bores 53 and 51.

Figure 5:
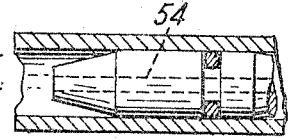
FIGURE 5 is a scrap section showing a modification of the example shown in FIGURE 4.

The other end of the tube 40 is closed by a similar stopper except that it is provided with a modified bore 54 shown in FIGURE 5, which extends right the way through it for the supply of water under pressure.

Figure 6:
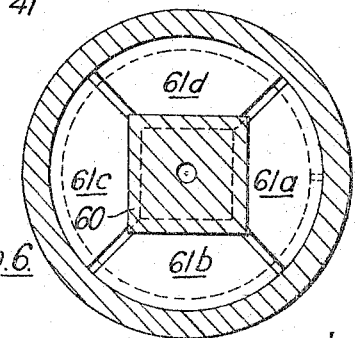
FIGURE 6 is a cross-section through the gripping ring showing a modification which is applicable to both the examples shown in FIGURES 1 and 4.

As already described in the introduction to the specification, the internal conical surfaces on the rings 13 and 46 will only fit accurately in one position on the corresponding conical surfaces of the portions 2 and 42. For this reason, instead of providing conical surfaces, the core may have a tapering portion 60, of square cross-section as shown in FIGURE 6, or other symmetrical polygonal section. The taper therefore forms a truncated pyramid. In this case, the gripping ring is formed of four or more sections similar to the sections 61a, 61b, 61c and 61d. The internal surfaces of these segments are flat and remain in uniform contact with the surfaces of the truncated pyramid 60 in all positions along its surface. The segments 61a to 61d are held in position by a rubber or other resilient ring in the same way as the segments of the ring 13.

A coiled compression spring (not shown) may be mounted on the core 1 between the left hand face of the ring 13 and the flange around the periphery of the shoulder 5. This spring pushes the ring 13 down the taper when the pressure in the tube 8 is released and the nut 17 is loosened to allow the stopper to be withdrawn.

In the third example illustrated in FIGURE 7, the core 62 is a circular rod having a screw threaded portion 63 at one end and a head 64 at the other end. The head is a truncated four sided pyramid, similar to the portion 60 shown in FIGURE 6, with an included angle of about 16°. The gripping ring consists of four segments and each of which has an internal surface which rides on one face of the truncated pyramid. The segments, of which two 65b and 65d are shown, are similar to the segments 61a, 61b, 61c and 61d shown in FIGURE 6 except that they have peripheral serrations. The four segments are held together on the head 64 which forms the tapering portion of the core by a surrounding rubber ring 66 which lies in a peripheral groove extending around all four segments.

A plug 67 is slidably mounted on a smooth cylindrical portion of the core 62 adjacent the narrower end of the pyramid 64 and is a close fit. The joint between the plug 67 and the core 62 is sealed by a rubber O-ring 68 lying in an annular groove 69 in the bore in which the core fits. Extending from the front face of the plug 67 and formed integrally with it is an annular boss 70 which forms a spacer and bears against the outside face of the four segments forming the gripping ring. At the end of the plug 67, from which the annular boss 70 extends, is a truncated conical section 71 which merges into a cylindrical portion 72.

A sealing ring 73, which is made of fibre-reinforced rubber and has a solid horseshoe-shaped cross section lies with its rounded nose on the narrow end of the portion 71. The remainder of its section surrounds the cylindrical portion 72. Surrounding the remainder of the cylindrical portion 72 of the plug is a backing ring 74 with cylindrical internal and external surfaces. The backing ring 74 has a flat face 75 which bears against the flat edge of the sealing ring 73 and the backing ring protrudes backwards beyond the end of the plug 67 and is engaged by a screw threaded ring 76 which is screwed on to the screw threaded portion 63 of the bore and holds the backing ring 74, the sealing ring 73, the plug 67 and the gripping ring made up of the segments 75 in position. The ring 76 is provided with two rearwardly projecting diametrically opposite handles 77.

In use, the screw threaded ring 76 is unscrewed sufficiently for the sealing ring to lie almost entirely on the cylindrical portion 72 of the plug 67. The stopper is then inserted into the end of the boiler tube 78 with the pyramid 64 foremost until only the screw threaded ring 76 and its handles 77 lie outside the tube. The outer end of the core 62 which protrudes from the screw threaded ring 76 is gripped and the screw threaded ring is rotated on the core by its handles 77. This pushes the backing ring 74, the sealing ring 73, the plug 67 and the gripping ring forwards on the core 62 until the gripping ring is forced to expand radially outwards by the pyramid 64 into engagement with the inner surface of the tube 78 and until the sealing ring is forced up the conical surface 71 of the plug so that the ring is expanded into engagement with the surface of the tube also. The rear surface of the sealing ring 73 from its inner periphery outwards remains supported by the flat face 75 of the backing ring 74. The only part of the sealing ring which is not supported against the pressure which is exerted upon it in use is that part which is expanded outwards beyond the outer periphery of the backing ring 74. The screw threaded ring 76 is turned until the sealing ring 73 is in intimate contact with the surface of the bore to form the main seal at the entrance to the tube 78. When the pressure is applied to the bore of the tube 78, and the core and plug may be provided with a water inlet and/or, an air outlet similar to those described with respect to the first two examples, the pressure acts on the inside face of the plug 67 and on the sealing ring 73 and its thrust is transmitted through the backing ring 74 and the screw threaded ring 76 on to the core 62. This tends to force the core outwards and thus forces its pyramidical head 64 still more tightly into the pads of the gripping ring so that the pads are further expanded and the stopper is self-locking in position.

We claim:

1. A stopper for insertion in the bore of a tube during pressure testing, said stopper comprising a tapering core having a large end and a small end, a divided gripping ring mounted on said tapering core, a tapering circular closure plug having a large end and a small end, a sealing ring mounted on said closure plug in surrounding relation thereto, means interconnecting said tapering core and said tapering plug with the small end of said core directed towards the large end of said plug and means for moving said sealing ring along said stopper from the small end towards the large end of said stopper and for moving said divided gripping ring along said core from the small end towards the large end of said core, whereby, when said stopper is inserted in said tube with said core leading said tapering plug, both said gripping ring and sealing ring may be expanded into contact with the wall of said tube, and pressure in said tube acting on said plug tends to move said plug and with it said core to expand said gripping ring and increase its grip on said tube.

2. A stopper according to claim 1, in which the means for moving said sealing and gripping rings comprises a backing ring adjacent said sealing ring and a screw threaded ring which is screwed on to a threaded portion of the core and bears against the outer radial face of the backing ring.

3. A stopper according to claim 2, in which the screw threaded ring lies outside the end of the tube when the gripping ring and the sealing ring are inserted within the end of the tube and is provided with a pair of radially extending handles to enable it to be tightened manually.

4. A stopper according to claim 1, in which the sealing ring is of solid horseshoe-shaped cross section with its rounded nose facing the wider end of the tapering portion of the plug.

5. A stopper according to claim 1, in which the tapering portion of the core is a truncated pyramid and the gripping ring is divided into a number of segments equal to the number of faces of the pyramid, each segment bearing against one face.

6. A stopper according to claim 5, in which the segments of the gripping ring are held in position on the core by a surrounding spring ring which fits in a peripheral groove in the segments.

7. A stopper according to claim 1, which has an axial bore through the core for the supply of water to carry out a hydrostatic test.

References Cited
UNITED STATES PATENTS

| | | | |
|---|---|---|---|
| 739,589 | 9/1903 | Clifford | 138—90 |
| 2,590,860 | 4/1952 | Hoebeke | 138—90 |
| 2,937,666 | 5/1957 | Maisch | 138—89 |

LAVERNE D. GEIGER, *Primary Examiner.*

T. MOORHEAD, *Assistant Examiner.*